(12) United States Patent
Kelly (10) Patent No.: US 7,996,978 B2
(45) Date of Patent: Aug. 16, 2011

(54) RETROGRESSION HEAT TREATMENT (75) Inventor: Richard M. Kelly, Hermitage, PA (US)

(73) Assignee: Werner Co., Greenville, PA (US)

( * ) Notice: Subject to any disclaimer, the term of this patent is extended or adjusted under 35 U.S.C. 154(b) by 1454 days.

(21) Appl. No.: 11/438,187

(22) Filed: May 22, 2006

(65) Prior Publication Data
US 2007/0266537 A1 Nov. 22, 2007

(51) Int. Cl.
*B23P 11/02* (2006.01)
(52) U.S. Cl. .............. 29/446; 29/525.1; 29/428; 29/809
(58) Field of Classification Search .................. 29/446, 29/525.1, 428, 509
See application file for complete search history.

(56) References Cited

U.S. PATENT DOCUMENTS

| | | | | |
|---|---|---|---|---|
| 3,181,651 A | * | 5/1965 | Larson | 182/228.6 |
| 4,766,664 A | * | 8/1988 | Benedyk | 29/512 |
| 4,959,107 A | * | 9/1990 | Wallick et al. | 148/566 |
| 5,458,393 A | | 10/1995 | Benedyk | |
| 5,911,844 A | | 6/1999 | Benedyk | |
| 7,028,404 B1 | | 4/2006 | Poirier et al. | |
| 2003/0188923 A1 | * | 10/2003 | Moss | 182/23 |

OTHER PUBLICATIONS

Wang Zhutang, Lu Zaihao Wang Honghua, "Advance of Retrogression Heat Treatment and the New Field of Application," China Academic Journal Electronic Publishing House, vol. 26 (No. 11), (Jan. 8, 1998).

* cited by examiner

*Primary Examiner* — Derris H Banks
*Assistant Examiner* — Jeffrey Carley
(74) *Attorney, Agent, or Firm* — Ansel M. Schwartz (57) ABSTRACT

A method for producing a product includes the steps of taking heated and cooled extrusion, preferably aluminum, and reheating a selected area of the extrusion. There is the step of requenching the extrusion. There is the step of forming the reheated area into a desired shape. A method for producing a ladder.

13 Claims, 12 Drawing Sheets

OUTSIDE BEAD

AS EXTRUDED & RHT

FIG.4

PREFORM BEAD
INSIDE RUNGS ONLY
THROUGH SIDERAIL

FIG.5

OUTSIDE BEAD

AS EXTRUDED & CUT FERRULE

*FIG.5A*
PRIOR ART

ASSEMBLED FERRULE ON RUNG WITH PREFORM BEND ON INSIDE TROUGH SIDERAIL

*FIG.6*
PRIOR ART

OUTSIDE BEAD

RUNG INSIDE COIL
HEATING ONLY
END TO BE FORMED

FIG.10

RAIL INSIDE COIL
HEATING ONLY
THE AREA TO BE BENT

FIG.11

AS EXTRUDED
& RHT RUNG

FIG.12

FORMED, FLATTENED END

FASTENED TO
SIDERAIL

FIG.15

AS EXTRUDED & RHT RUNG

FIG.16
FORMED

ASSEMBLED
FIG.17

RETROGRESSION HEAT TREATMENT

FIELD OF THE INVENTION

The present invention pertains to a method for producing a product by taking a heated and cooled aluminum extrusion and reheating a selected area of the extrusion and then requenching the extrusion. More specifically, the present invention pertains to a method for producing a product by taking a heated and cooled aluminum extrusion and reheating a selected area of the extrusion and then requenching the extrusion and forming it into a rung or a rail.

BACKGROUND OF THE INVENTION

Manufacturers using extrusions made of material such as aluminum are constantly seeking ways to reduce costs by using less aluminum than otherwise used for the manufacture of a given product. By being able to use less aluminum in regard to length than otherwise used or less aluminum in regard to wall thickness and yet attain the same structural properties than otherwise used, allows a manufacturer to reduce costs by using less aluminum for a given product. The present invention provide a manufacturer to use less aluminum in regard to length and wall thickness than otherwise used.

SUMMARY OF THE INVENTION

The present invention pertains to a method for producing a product. The method comprises the steps of taking heated and cooled extrusion, preferably aluminum, and reheating a selected area of the extrusion. There is the step of requenching the extrusion. There is the step of forming the reheated area into a desired shape. There is the step of attaching an aluminum extrusion at the area directly with a member made of a different material than the extrusion.

The present invention pertains to a method for producing a product. The method comprises the steps of taking heated and cooled aluminum extrusion and reheating a selected area of the extrusion to temporarily afford a 20% or more improvement in material ductility relative to the pre-reheated but cooled extrusion, assisting forming operations used to assemble or join with other components of the same material or in combination with differing materials in the product. There is the step of requenching the extrusion. There is the step of forming the reheated area into a desired shape.

The present invention pertains to a method for producing a product. The method comprises the steps of taking heated and cooled aluminum extrusion and reheating a selected area of the extrusion to temporarily afford a 20% or more improvement in material ductility relative to the pre-reheated but cooled extrusion, assisting forming and assembly operations to complete joints directly and without additional components. There is the step of requenching the extrusion. There is the step of forming the reheated area into a desired shape.

The present invention pertains to a method for producing a product. The method comprises the steps of taking heated and cooled aluminum extrusion and reheating a selected area of the extrusion to temporarily afford a 20% or more improvement in material ductility relative to the pre-reheated but cooled extrusion, assisting forming and assembly operations to complete joints by providing joining geometries for traditional fasteners. There is the step of requenching the extrusion. There is the step of forming the reheated area into a desired shape.

The present invention pertains to a method for producing a product. The method comprises the steps of taking heated and cooled aluminum extrusion and reheating a selected area of the extrusion to temporarily afford a 20% or more improvement in material ductility relative to the pre-reheated but cooled extrusion, assisting forming of components to provide additional product functions, with or without additional components. There is the step of requenching the extrusion. There is the step of forming the reheated area into a desired shape.

The present invention pertains to a method for producing a product. The method comprises the steps of taking heated and cooled aluminum extrusion and reheating a selected area of the extrusion to temporarily afford a 20% or more improvement in material ductility and restoration of near 100% original strength characteristics that avoid a path of material substitutions which require additional material thicknesses to meet load bearing requirements. There is the step of requenching the extrusion. There is the step of forming the reheated area into a desired shape.

The present invention pertains to a method for producing a product. The method comprises the steps of taking heated and cooled aluminum extrusion and reheating a selected area of the extrusion to afford a 20% or greater improvement in fatigue performance relative to the pre-reheated but cooled extrusion. There is the step of requenching the extrusion. There is the step of forming the reheated area into a desired shape.

A method for producing a ladder. The method comprises the steps of taking heated and cooled aluminum extrusion and reheating a selected area of the extrusion. There is the step of requenching the extrusion. There is the step of forming the reheated area into a rung. There is the step of attaching the rung to a rail.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
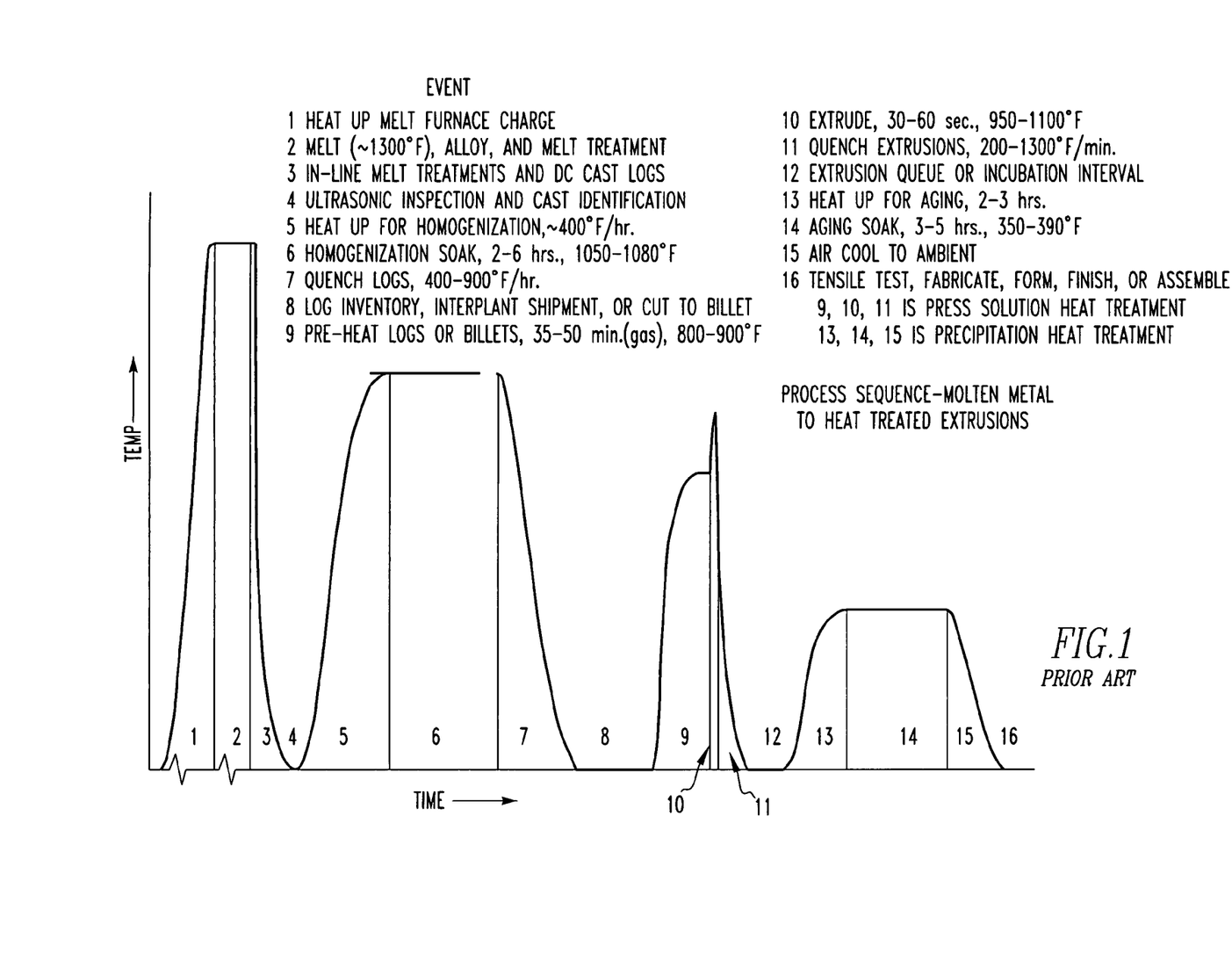
FIG. 1 is a graph of a process sequence regarding molten metal into heat treated extrusions of the prior art.
Figure 2:
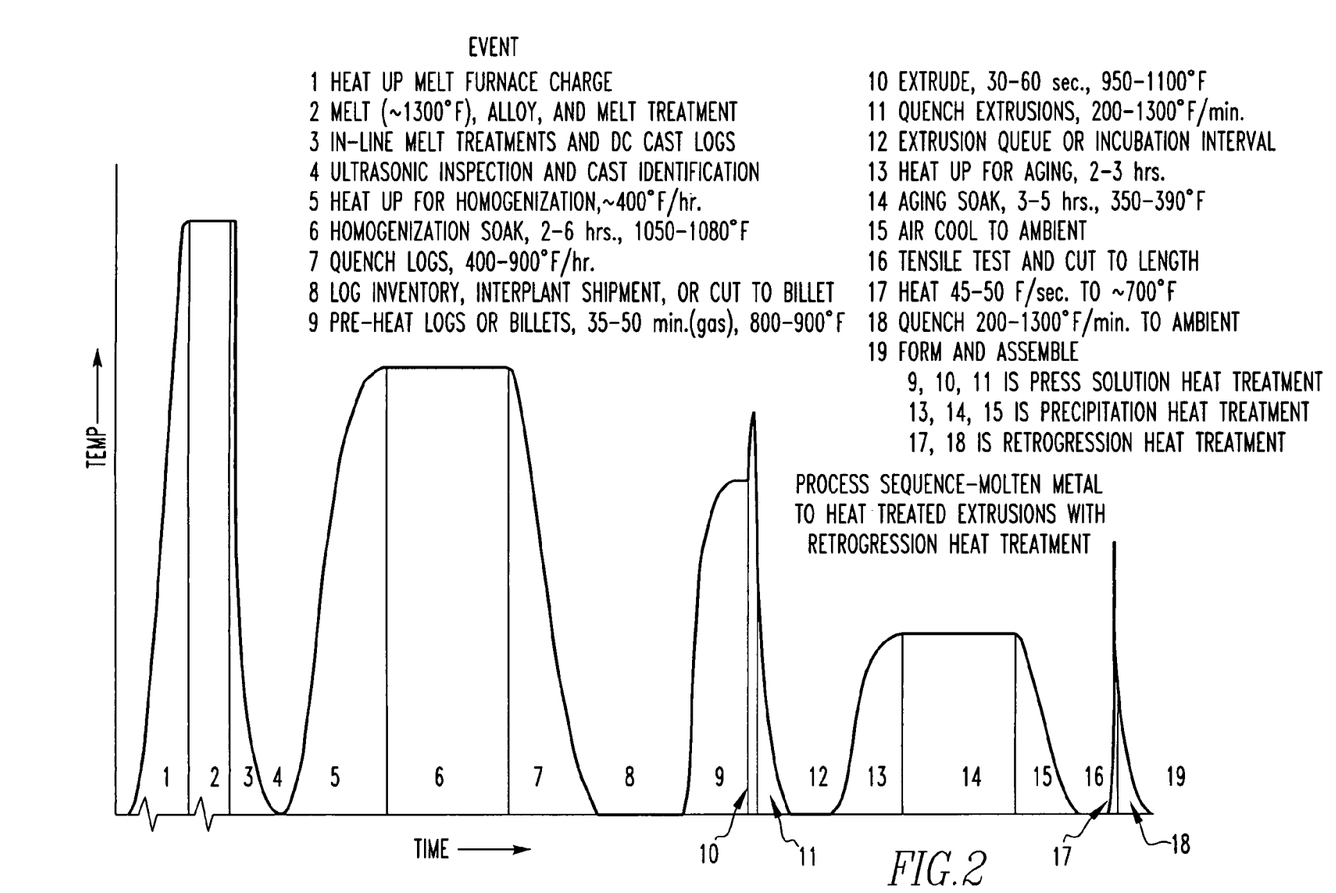
FIG. 2 is a graph of a process sequence regarding molten metal to heat treated extrusions with retrogression heat treatment (RHT) of the present invention.

Referring now to the drawings wherein like reference numerals refer to similar or identical parts throughout the several views, and more specifically to FIG. 2 thereof, there is shown a graph of the RHT process of the present invention.

The present invention pertains to a method for producing a product. The method comprises the steps of taking heated and cooled extrusion, preferably aluminum, and reheating a selected area of the extrusion. There is the step of requenching the extrusion. There is the step of forming the reheated area into a desired shape. There is the step of attaching the extrusion at the area directly with a member made of a different material than the extrusion. It should be noted that for purposes herein, a selected area could be the entire extrusion or any portion thereof. Some examples of combinations of differing materials are metal to non-metal, such as an aluminum rung to a fiberglass rail, or aluminum (rung) to plastic components (ladder top).

Preferably, the forming step includes the step of forming the reheated area into the desired shape within five days of requenching. The taking step preferably includes the step of reheating the area to at least 550° F., and preferably 700° 0F. Preferably, the reheating step includes the step of reheating the area at a rate of 5°-95° F. per second and preferably 45-50° F. per second. The reheating step preferably includes the step of reheating the area to at least 550° F. within 10-75 seconds. Preferably, the forming step includes the step of attaching the extrusion at the area directly with a member.

The attaching step preferably includes the step of attaching the extrusion at the area directly with the member without any additional piece. Preferably, before the taking step, there is the step of press solution heat treating the extrusion. Before the taking step, there is preferably the step of quenching the extrusion rapidly enough to retain alloying elements in the extrusion in solution. Preferably, before the taking step, there is a step of stretching the extrusion. Before the taking step, there is preferably the step of artificially aging with precipitation heat treatment the extrusion.

Figure 3:
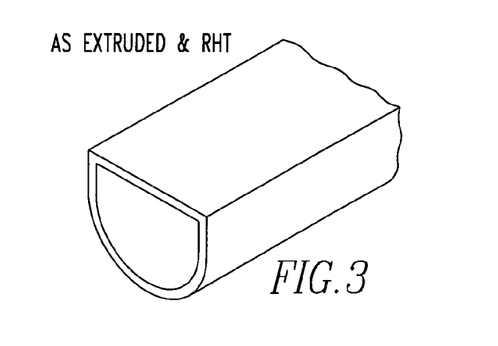
FIG. 3 is a perspective view of an extruded rung whose end experienced RHT.
Figure 4:
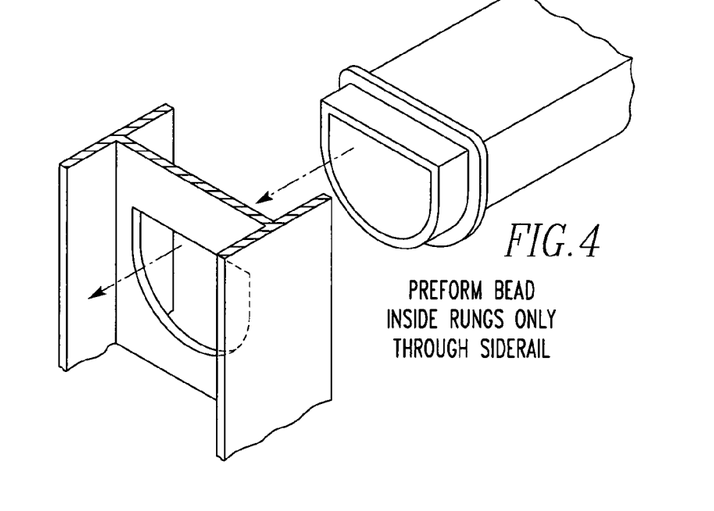
FIG. 4 is a perspective view of the rung having a preformed bead about to be inserted through a side rail.
Figure 5:
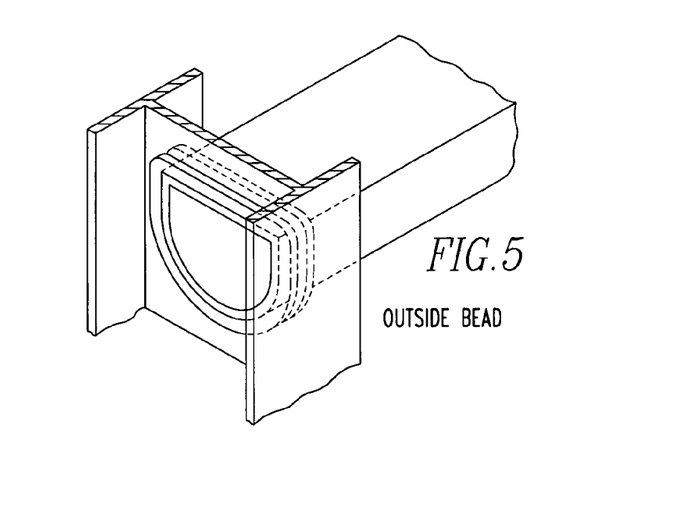
FIG. 5 is a perspective view of the rung in the side rail held to the side rail with an outside bead.
Figure 5A:
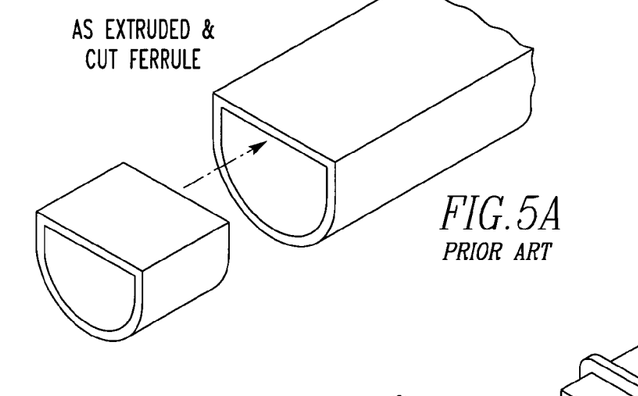
FIG. 5a is a perspective view of a ferrule about to be attached to a rung of the prior art.
Figure 6:
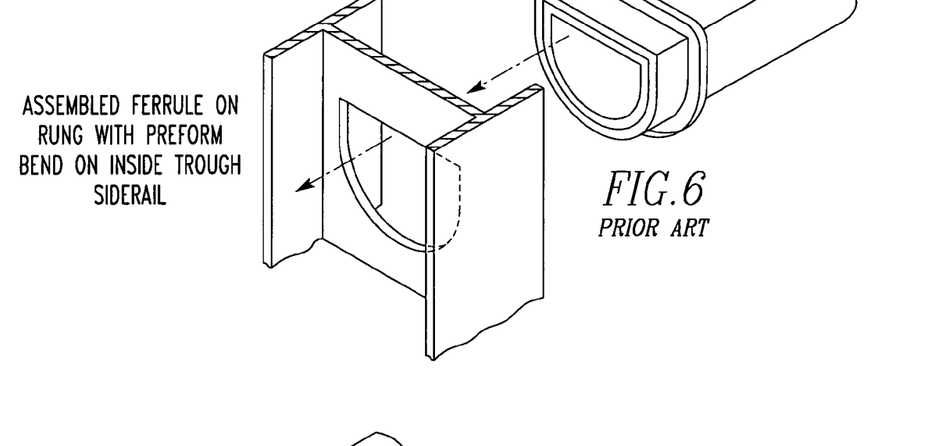
FIG. 6 is a perspective view of an assembled ferrule on a rung with a preformed bead on the inside about to be inserted through a side rail of the prior art.
Figure 7:
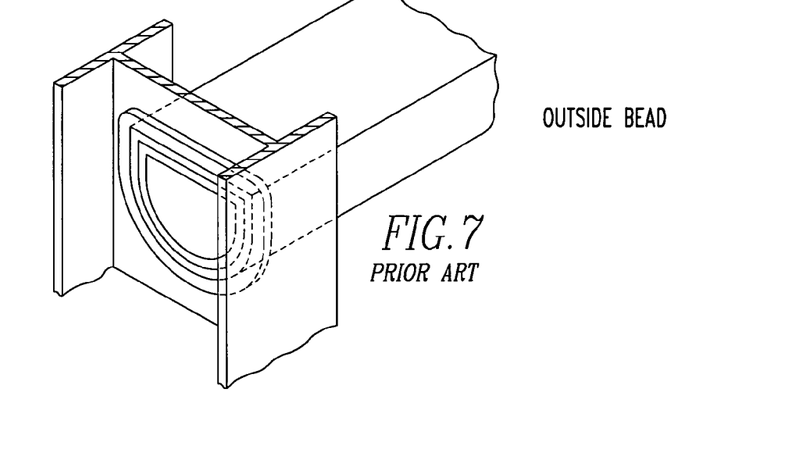
FIG. 7 is a perspective view of the rung attached to the side rail with an outside bead of the prior art.
Figure 8:
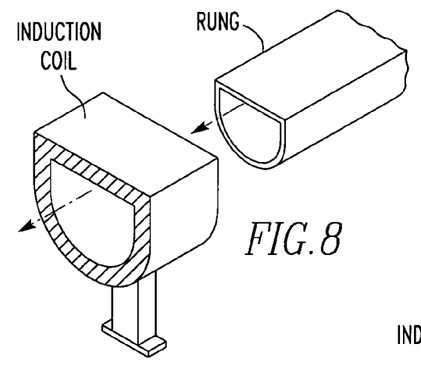
FIG. 8 is a perspective view of an extrusion having its end about to be inserted in an induction coil for the RHT process.
Figure 9:
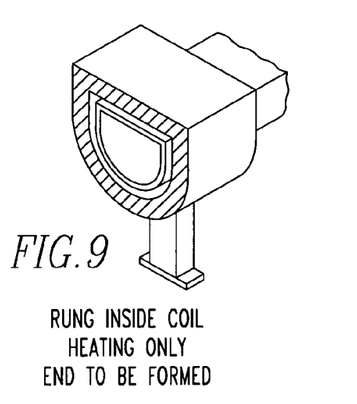
FIG. 9 is a perspective view of a rung inside the induction coil heating only the end to be formed of the RHT process.
Figure 10:
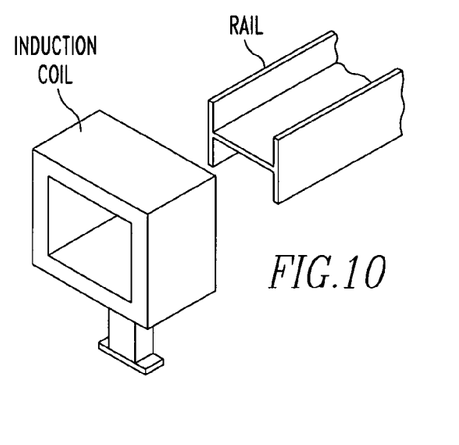
FIG. 10 is a perspective view of a rail about to be inserted into an induction coil for the RHT process.
Figure 11:
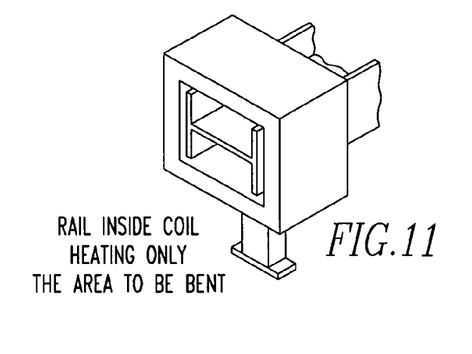
FIG. 11 is a perspective view of the rail inside the coil heating only the area to be bent on the rail for the RHT process.
Figure 12:
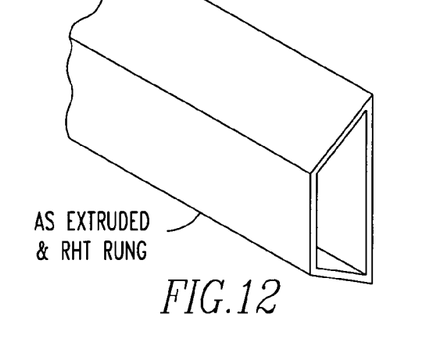
FIG. 12 is a perspective view of an extruded rung having its end having undergone the RHT process.

Preferably, the reheating step includes the step of reheating the end of the extrusion in an induction coil. Before the taking step, there is preferably the step of casting a log from molten alloyed aluminum. Preferably, before the taking step, there is the step of homogenizing the log at a temperature greater than 900° F. for several hours. Before the taking step, there is preferably the step of cutting the log into billets after the log is quenched. Preferably, before the taking step, there is the step of preheating and excluding the log into a desired cross-section to form the extrusion. Before the taking step, there is the step of cutting the extrusion to a desired length. Preferably, the extrusion is a rung and a member is a ladder rail, and the attaching step includes a step of attaching the rung at the area directly with the ladder rail without any additional piece, as shown in FIGS. 3-5.

Figure 13:
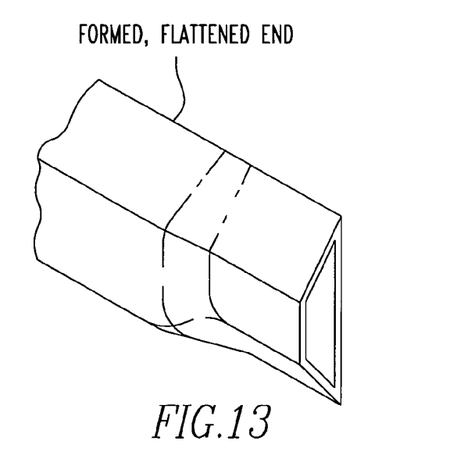
FIG. 13 is a perspective view of the rung having a formed flattened end having undergone the RHT process.
Figure 14:
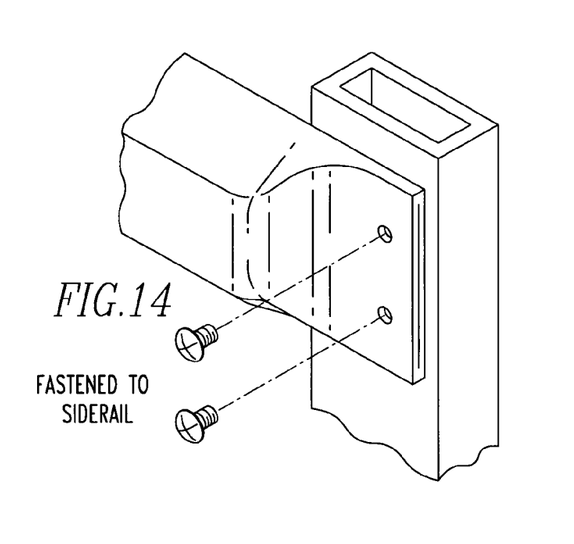
FIG. 14 is a perspective view of the flattened end of the rung having undergone the RHT process fastened to the side rail with fasteners.
Figure 15:
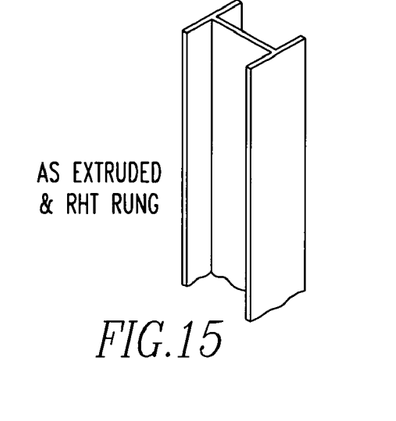
FIG. 15 is a perspective view of an extruded side rail having undergone the RHT process.
Figure 16:
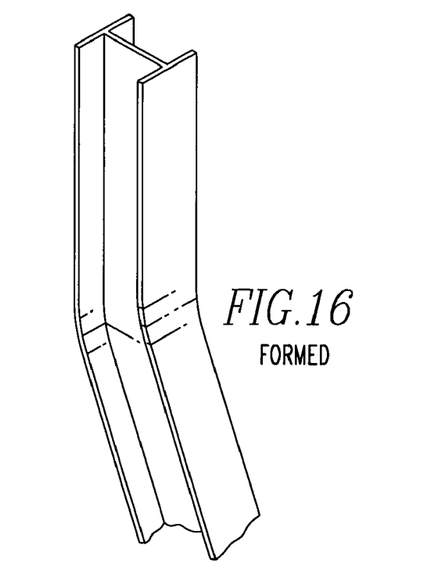
FIG. 16 is a perspective view of the formed extruded side rail having undergone the RHT process.
Figure 17:
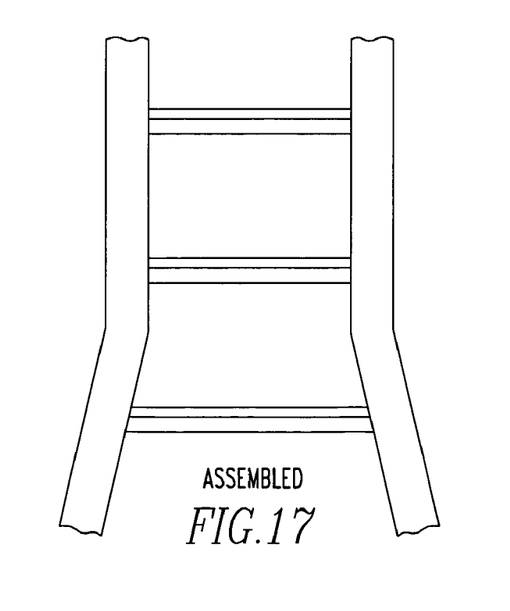
FIG. 17 is a perspective view of an assembled ladder having formed side rails which had undergone the RHT process.

The attaching step preferably includes the step of forming a joint out of the rung with the rail. Preferably, the attaching step includes the step of inserting rivets through the rung and the rail to attach the rung to the rail, as shown in FIG. 14. The attaching step preferably includes the step of flattening the end of the rung, as shown in FIG. 13. Preferably, the extrusion is a rail and wherein the forming step includes the step of forming the rail into a desired shape, as shown in FIGS. 15-17.

The present invention pertains to a method for producing a product. The method comprises the steps of taking heated and cooled aluminum extrusion and reheating a selected area of the extrusion to afford a 20%, and preferably a 30%, and more preferably, a 50% or more improvement in material ductility relative to the pre-reheated but cooled extrusion, assisting forming operations used to assemble or join with other components of the same material or in combination with differing materials in the product. There is the step of requenching the extrusion. There is the step of forming the reheated area into a desired shape.

The present invention pertains to a method for producing a product. The method comprises the steps of taking heated and cooled aluminum extrusion and reheating a selected area of the extrusion to afford a 20%, and preferably a 30%, and more preferably, a 50% or more improvement in material ductility relative to the pre-reheated but cooled extrusion, assisting forming and assembly operations to complete joints directly and without additional components. There is the step of requenching the extrusion. There is the step of forming the reheated area into a desired shape. An example is a rail with a rung without a ferrule.

The present invention pertains to a method for producing a product. The method comprises the steps of taking heated and cooled aluminum extrusion and reheating a selected area of the extrusion to afford a 20%, and preferably a 30%, and more preferably, a 50% or more improvement in material ductility relative to the pre-reheated but cooled extrusion, assisting forming and assembly operations to complete joints by providing joining geometries for traditional fasteners. There is the step of requenching the extrusion. There is the step of forming the reheated area into a desired shape. An example is a rail with a rung having a flattened end connected to the rail with rivets.

The present invention pertains to a method for producing a product. The method comprises the steps of taking heated and cooled aluminum extrusion and reheating a selected area of the extrusion to afford a 20%, and preferably a 30%, and more preferably, a 50% or more improvement in material ductility relative to the pre-reheated but cooled extrusion, assisting forming of components to provide additional product functions, with or without additional components. There is the step of requenching the extrusion. There is the step of forming the reheated area into a desired shape.

The present invention pertains to a method for producing a product. The method comprises the steps of taking heated and cooled aluminum extrusion and reheating a selected area of the extrusion to afford a 20%, and preferably a 30%, and more preferably, a 50% or more improvement in material ductility and restoration of near 100% original strength characteristics that avoid a path of material substitutions which require additional material thicknesses to meet load bearing requirements. There is the step of requenching the extrusion. There is the step of forming the reheated area into a desired shape. For example, a load bearing component in an assembly needs to be formed to complete a joint. Traditionally, lower strength alloys or tempers are employed to accommodate the formability needs, but in doing so, the overall material strength is diminished. To compensate for this, thicker material is used to meet load carrying requirements for the component at an additional cost. RHT allows for the higher strength alloy and temper to be used without bolstering the thicknesses to meet loading requirements, as no adjustment to accommodate forming is needed.

The present invention pertains to a method for producing a product. The method comprises the steps of taking heated and cooled aluminum extrusion and reheating a selected area of the extrusion to afford a 20%, and preferably a 30%, and more preferably, a 50% or greater improvement in fatigue performance relative to the pre-reheated but cooled extrusion. There is the step of requenching the extrusion. There is the step of forming the reheated area into a desired shape. The RHT material structure is better suited to resist fatigue type failures. The value of 50% is conservative as a two fold improvement, or more, may be realized.

A method for producing a ladder. The method comprises the steps of taking heated and cooled aluminum extrusion and reheating a selected area of the extrusion. There is the step of requenching the extrusion. There is the step of forming the reheated area into a rung. There is the step of attaching the rung to a rail.

In the operation, Retrogression Heat Treatment (RHT) advantages relative to ladder and climbing products are centered on the elimination of metal cost for ferrule and its associated production costs. Potential savings are partially diminished in extending the length of rung required to complete the ladder rail joint without ferrule.

1. Prior to Retrogression Heat Treatment (RHT), aluminum extrusions are processed in the traditional way, as shown in FIG. 2. Structural T6-type tempers are press solution heat treated, dissolving alloying elements into a super saturated solid solution and quenching rapidly enough, with either air or water or both, to retain the alloying elements in solution. After stretching operations, the extrusions are artificially aged in a precipitation heat treatment step to attain final T6 properties.
2. RHT temporarily alters the material strength through rapid re-heating of selected areas of the extrusion, followed by re-quenching. This interim processing step places the material in a formable condition for one to two days in duration.
2A. Typical re-heating occurs in about 15 seconds with a temperature rise of 45-50° F. per second followed by quenching. From this, the minimum target temperatures for RHT of 6xxx series aluminum alloys are approximately 700 to 750° F. For ladder applications, only the to be formed ends of the rung are heated, though flared side rail ends are a future possibility.
3. Forming of RHT extrusions imparts cold work during deformation, restoring the material to its original T6 heat treated condition and associated material properties. Attachment to other members, of the same or differing materials, can be accomplished without additional pieces such as ferrule in ladder assemblies.
4. Characteristics of fatigue strength are thought to be improved with the RHT processing method.

An induction coil has been used that only surrounds the end portion of a cut to length rung, heating only that area, as shown in FIG. 8-11. There is, however, a temperature gradient from the heated area to the unheated center portion, due to aluminum's thermal conductivity.

When in the more formable condition after RHT, rung ends can be formed to produce a joint without the use of additional pieces such as ferrule. Ferrule is currently used as the softer, and more formable condition, whereas the rung cannot be successfully formed in its harder, higher strength condition. Here, RHT allows one piece, the rung, to perform two functions as both the forming member and structural component. Also in this regard, applications which have been designed where a component serves in this dual role and RHT not employed, the compromise most often utilized is to select a lower strength alloy to accomplish the forming needs. One example of this is the MT product. In doing so, wall thickness is typically increased to provide the needed component strength with the "weaker" alloy. This additional material cost is unnecessary with RHT.

Sequentially, a log is cast from molten alloyed aluminum, homogenized at an elevated temperature (>1000 F) for several hours (>6 hrs) and quenched, cut into billet lengths, preheated (~850 F) and extruded through a die to final cross section profile increasing its temperature during extrusion (>935 F) and then quenched (press solution heat treatment), stretched for longitudinal straightening, cut to mill lengths, artificially aged at a moderate temperature (~365 F) for several hours (precipitation heat treatment), cut to part lengths, rapidly heated (>700 F) in selected area(s) and upon reaching the desired temperature immediately quenched (retrogression heat treatment), and subsequently formed as needed within 24 or 48 hours.

In the prior art, joining to a C-channel, I-beam or other cross section profile side rails, round or D-shaped rung and ferrule assemblies are projected through pre-fabricated openings in the side rails and swaged, as shown in FIGS. 5a-7. This rung-to-rail joint assembles through the use of malleable ferrule components which are slipped over the ends of each rung and upset radially in a tool set, press fitting the ferrule to the rung and producing an inner bead or shoulder which contacts the inside portions of the ladder side rail. Swaging the assembly completes the rung-to-rail joint by upsetting the outward portion of the ferrule, producing an outer bead or shoulder which contacts the outside portions of the ladder side rail. This method of assembly sandwiches the web of the side rails within the inside and outside ferrule nodes. Each rung joint comprises one rung, two ferrules and two side rails.

In the present invention, joining to a C-channel, I-beam or other cross section profile side rails, round or D-shaped rungs which have undergone RHT are projected through pre-fabricated openings in the side rails and swaged. This rung-to-rail joint assembles through the use of malleable rung ends and upset radially in a tool set, producing an inner bead or shoulder on the rung which contacts the inside portions of the ladder side rail. Swaging the assembly completes the rung-to-rail joint by upsetting the outward portion of the rung, producing an outer bead or shoulder which contacts the outside portions of the ladder side rail. This method of assembly sandwiches the web of the side rails within the inside and outside rung nodes. Each rung joint comprises one rung and two side rails.

Post heating 6xxx series alloys in the –T6 condition with induction has been tested on multiple occasions. In summary, these tests used production extrusion profiles, induction heated on each end for 15 seconds with a temperature rise of 45-50° F. per second, and quenched with air and water. Material after thermal processing exhibited enhanced ductility and was successfully formed within 12, 24 and 48 hours. Recovery of strength following cold work (forming) and natural aging was demonstrated by structural tests of assembled ladder sections which passed required load values. This was accomplished on both swaged rung as well as formed rung for rivet assembly.

Figure 18:
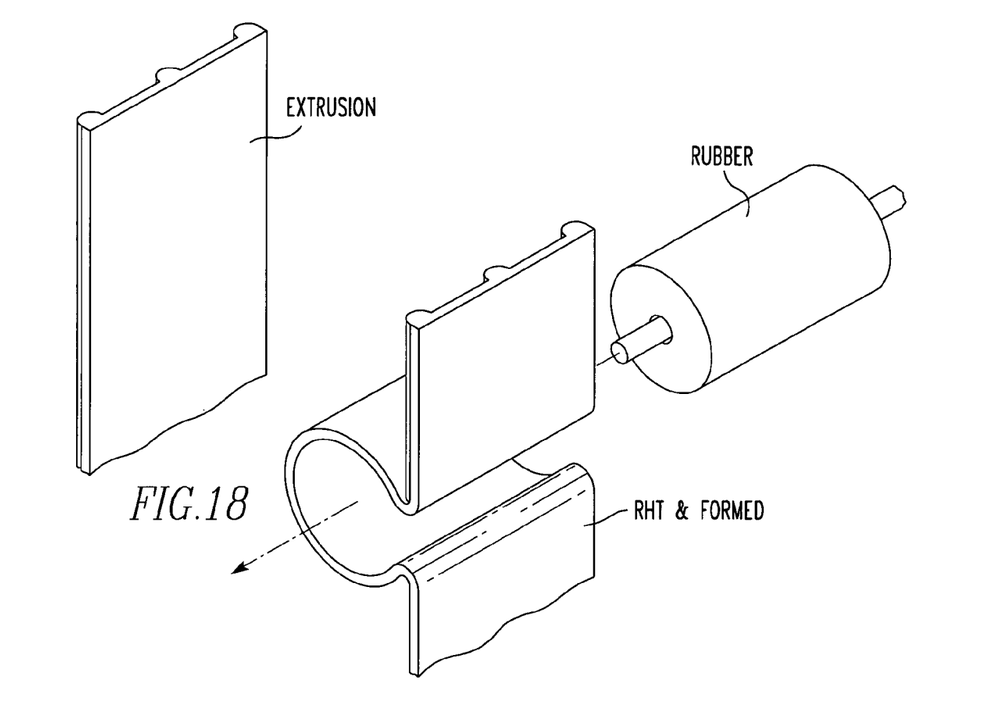
FIG. 18 is a perspective view of an electrical conductor with an extrusion which had undergone the RHT process.
Figure 19:
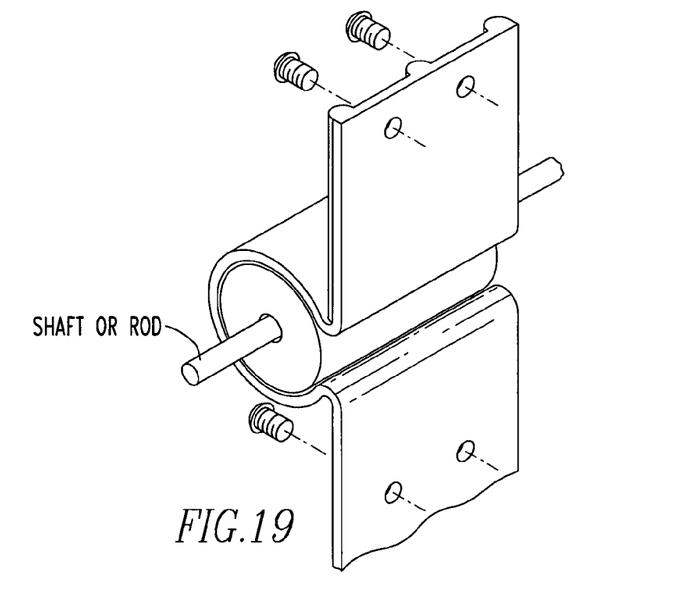
FIG. 19 is a perspective view of an electrical conductor having a shaft or rod with an extrusion which had undergone the RHT process.
Figures 20, 21, 22, 23:
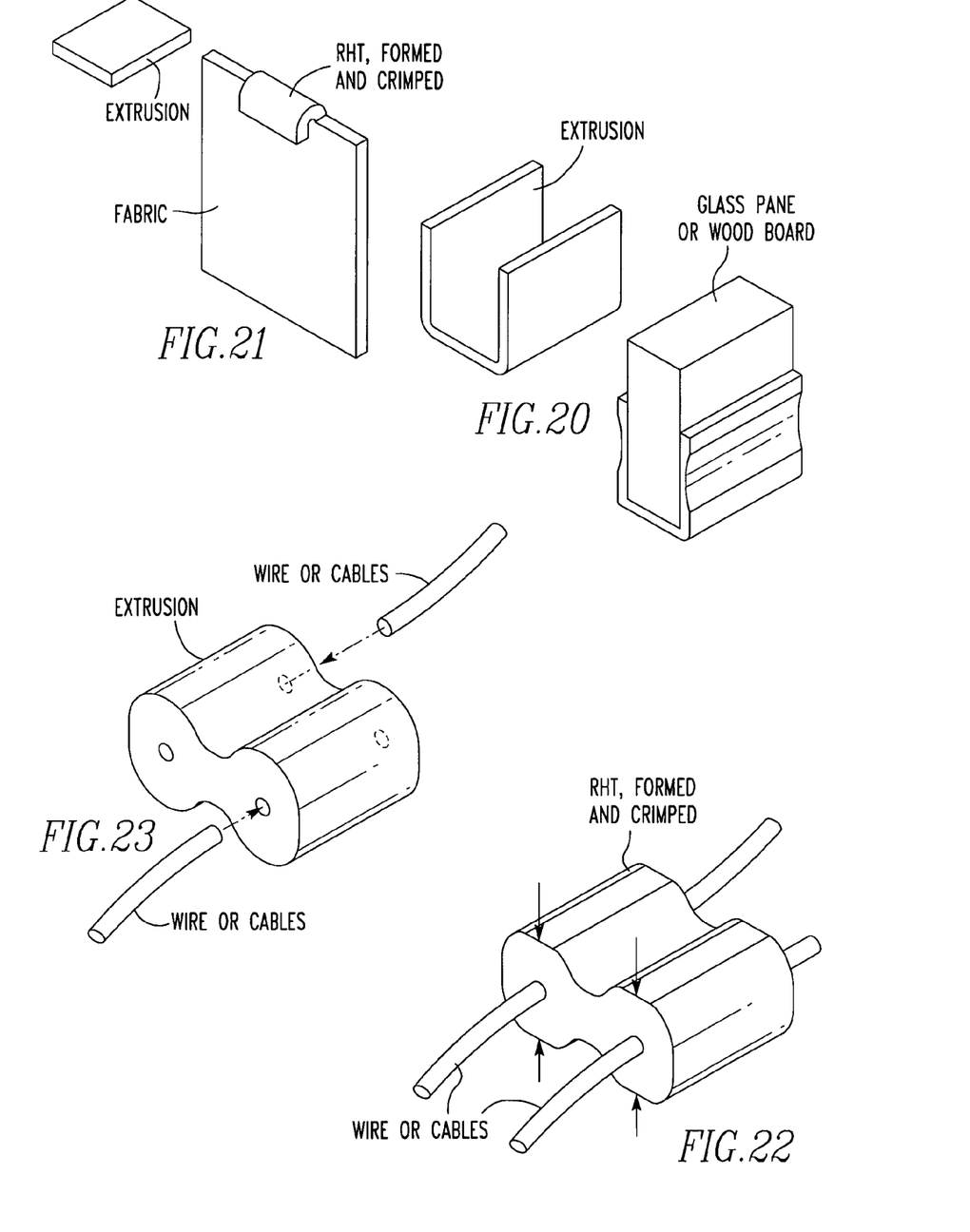
FIG. 20 is a perspective view of a nonmetallic material with an extrusion which had undergone the RHT process.
FIG. 21 is a perspective view of a nonmetallic material with an extrusion which had undergone the RHT process.
FIG. 22 is a perspective view of a nonmetallic material with an extrusion which had undergone the RHT process.
FIG. 23 is a perspective view of a nonmetallic material with an extrusion which had undergone the RHT process.
Figures 24, 25:
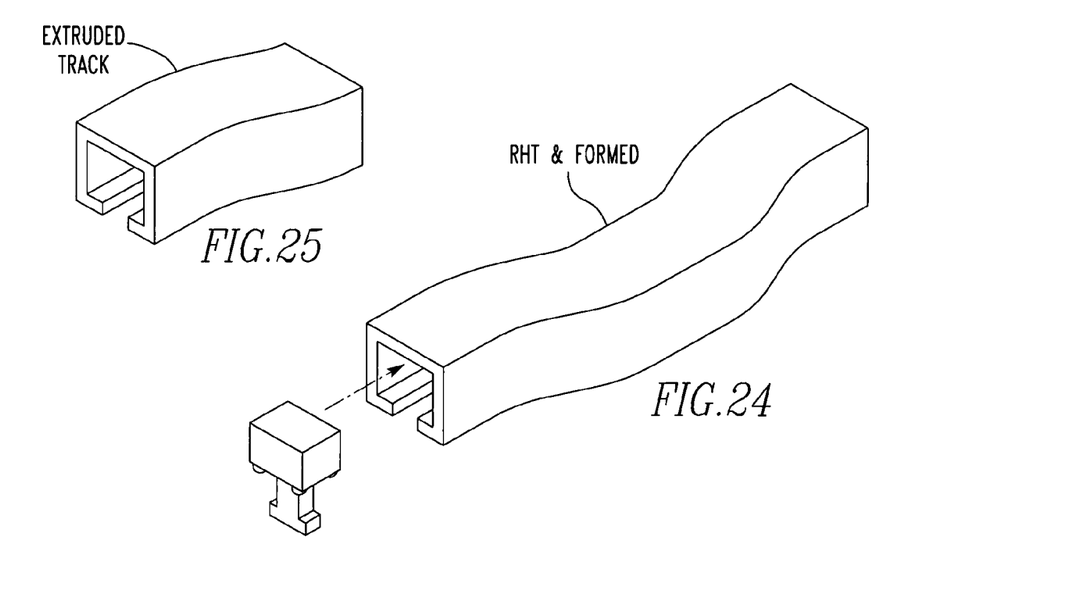
FIG. 24 is a perspective view of an extruded track which had undergone the RHT process.
FIG. 25 is a perspective view of a formed extruded track which had undergone the RHT process.

RHT component(s) can be formed to provide cavities or attachments to couple with rubbers and polymer materials for purposes of vibration isolation, such as motor mounts or other dampening devices, as shown in FIGS. 18 and 19.

Rubbers and polymer materials can be coupled with RHT component(s) for purposes of galvanic corrosion isolation, such as when joining dissimilar metals, and the avoidance of galvanic corrosion in service, as shown in FIGS. 18 and 19.

Fiberglass reinforced plastics, injection molded plastics, blow molded plastics, plastic extrusions and other non-metallic materials, including glass, ceramics, wood, and fabrics, can be coupled with RHT component(s) as the actual forming and assembly takes place at: 1) ambient temperature, rather than elevated temperatures which may effect certain plastics, fabrics, etc., and 2) lowered forming pressures as the RHT material is in the softened state prior to and during forming, as shown in FIGS. 20, 21, 26 and 27.

Metals and alloys differing from the metals and alloys used in RHT can be coupled with RHT component(s), such as titanium to aluminum, stainless steel to aluminum, etc, as shown in FIGS. 20, 21, 22, 23, 28 and 29.

Figure 30:
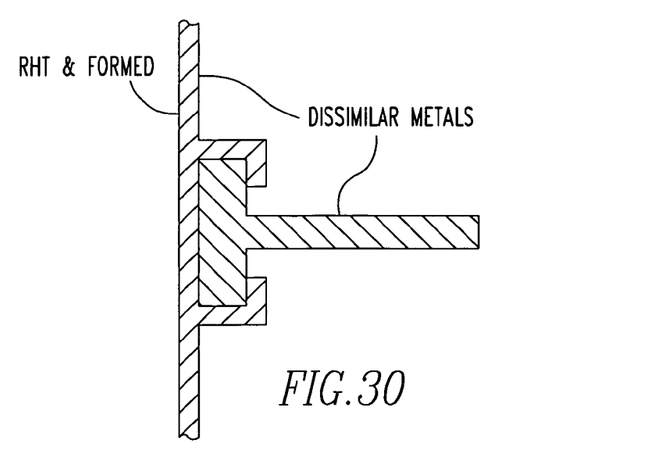
FIG. 30 is a perspective view of a formed extrusion which had undergone the RHT process and a dissimilar metal object.

Metals and alloys differing from the metals and alloys used in RHT can be coupled with RHT component(s) for purposes of producing a galvanic couple, such as in sacrificial anode applications, as shown in FIG. 30.

RHT time and temperature processing cycles can be varied (independently or in combination) to provide a range of formability improvements, and dependant or tailored to the severity of forming application requirements.

Figure 31:
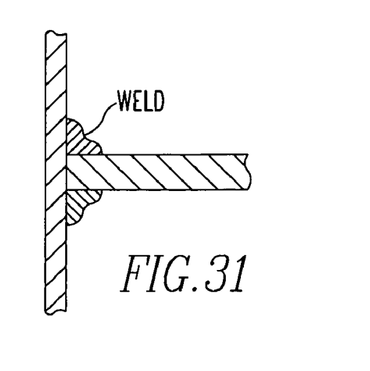
FIG. 31 is a perspective view of an assembly with a formed extrusion which had undergone the RHT process.
Figure 32:
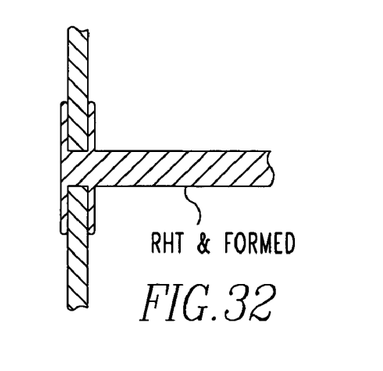
FIG. 32 is a perspective view of an assembly with a formed extrusion which had undergone the RHT process.
Figure 33:
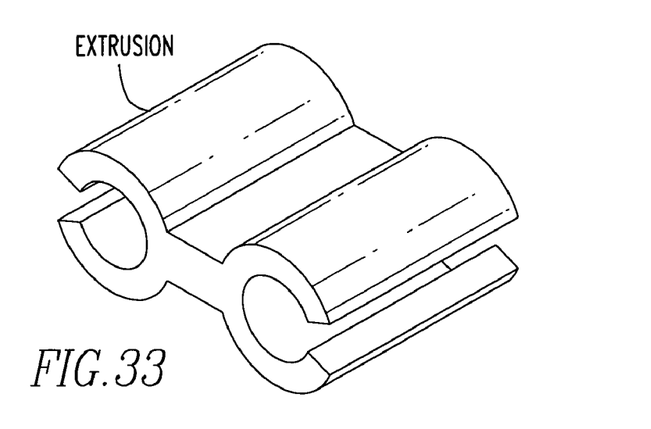
FIG. 33 is a perspective view of an extrusion which had undergone the RHT process.
Figure 34:
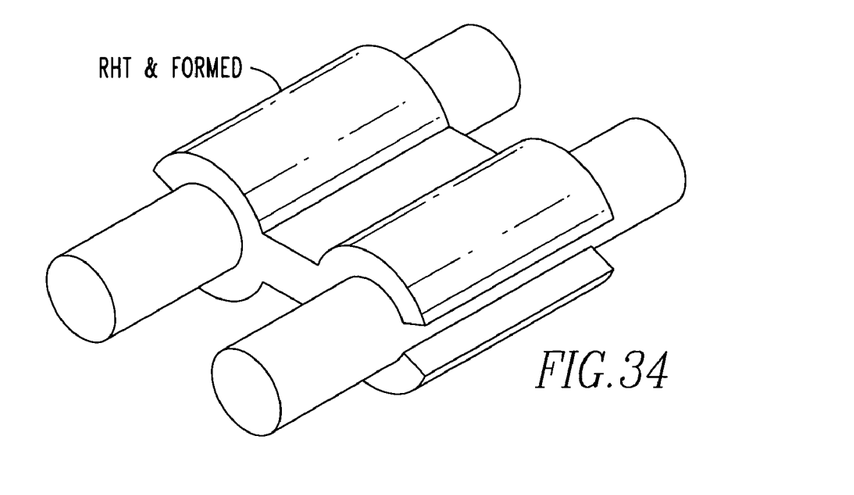
FIG. 34 is a perspective view of a formed extrusion which had undergone the RHT process with cable.

RHT component(s) can be formed to produce assemblies in substitution for welded assemblies, as shown in FIGS. 31 and 32.

RHT component(s) can be formed to produce assemblies where welded assemblies are not possible or practical due to the use of plastics or other non-metallic components, as shown in FIGS. 20, 21, 26, 27, 33 and 34.

RHT component(s) can be formed to produce assemblies where welded assemblies are not possible or practical due to the use differing metals and alloys that are incompatible with welding processes, or incompatible to welding in combination, as shown in FIGS. 20, 21, 26, 27, 33 and 34.

RHT of metals and alloys suitable for electrical conductor applications can be formed to meet bending and strength requirements including tab interlock joints and threaded connections where torque and pull-out performance can be improved in comparison to convention tempers of lowered strength, as shown in FIGS. 22, 23, 33 and 34.

RHT of metals and alloys suitable for electrical conductor applications can be formed with insulator materials to electrically isolate components in an assembly from each other or ground, as shown in FIGS. 18 and 19.

RHT component(s) can be formed to provide splice or crimp joints for metallic and non-metallic components such as cable, wire, rope or other part configurations, as shown in FIGS. 22, 23, 33 and 34.

Figure 28:
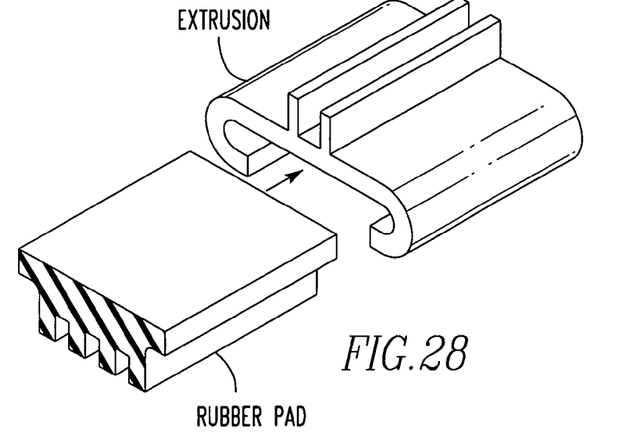
FIG. 28 is a perspective view of an extrusion which had undergone the RHT process and a non-metallic material.
Figure 29:
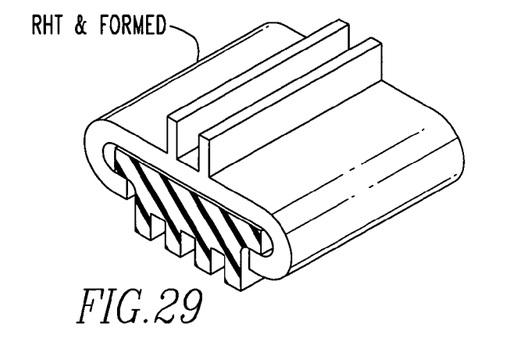
FIG. 29 is a perspective view of a formed extrusion which had undergone the RHT process and a non-metallic material.

RHT component(s) can be formed with or provide cavities or attachments to couple with rubbers and polymer materials for purposes of slip resistant surfaces, such as ladder feet applications, as shown in FIGS. 28 and 29.

Figures 26, 27:
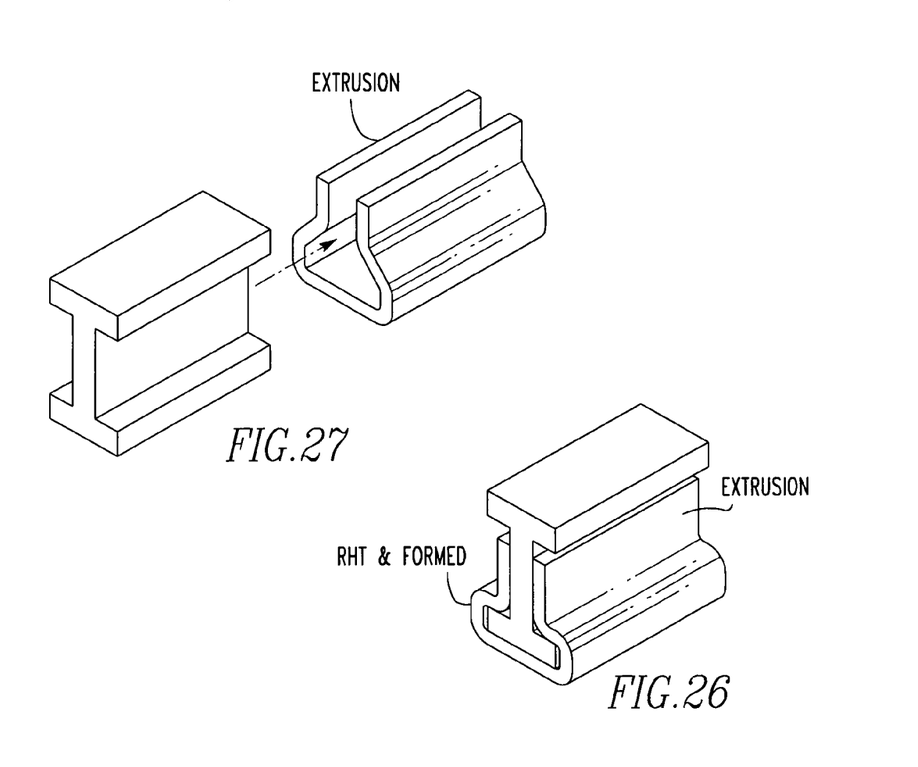
FIG. 26 is a perspective view of an extruded track which had undergone the RHT process.
FIG. 27 is a perspective view of a formed extruded track which had undergone the RHT process.

RHT component(s) can be formed to provide housings or affix bearings comprised of dissimilar materials, as shown in FIGS. 19, 26 and 27.

RHT component(s) can be formed to provide track slots for conveyance either directly re-shaping the cross section or bending the lineal cross section in one or more locations to form curves, bends, or stops, as shown in FIGS. 24, 25, 26 and 27.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for producing a ladder comprising the steps of:
   press solution heat treating the extrusion;
   quenching the extrusion rapidly enough to retain alloying elements in the extrusion in solution;
   stretching the extrusion;
   taking the heated and quenched aluminum extrusion and reheating a selected area of the extrusion to at least 550° F. within 10-75 seconds at a rate of 5°-95° F. per second;
   requenching the extrusion;
   forming the reheated area into a rung within 5 days of quenching; and
   attaching the rung directly to a rail without any additional piece.

2. A method as described in claim 1 wherein before the taking step, there is the step of artificially aging with precipitation heat treatment the extrusion.

3. A method as described in claim 2 wherein the reheating step includes the step of reheating the end of the extrusion in an induction coil.

4. A method as described in claim 3 wherein before the taking step, there is the step of casting a log from molten alloyed aluminum.

5. A method as described in claim 4 wherein before the taking step, there is the step of homogenizing the log at a temperature greater than 900° F. for several hours.

6. A method as described in claim 5 wherein before the taking step, there is the step of cutting the log into billets after the log is quenched.

7. A method as described in claim 6 wherein before the taking step, there is the step of preheating and excluding the log into a desired cross-section to form the extrusion.

8. A method as described in claim 7 wherein before the taking step, there is the step of cutting the extrusion to a desired length.

9. A method as described in claim 8 wherein the attaching step includes a step of attaching the rung at the area directly with the ladder rail without any additional piece.

10. A method as described in claim 9 wherein the attaching step includes the step of forming a joint out of the rung with the rail.

11. A method as described in claim 10 wherein the attaching step includes the step of inserting rivets through the rung and the rail to attach the rung to the rail.

12. A method as described in claim 11 wherein the attaching step includes the step of flattening the end of the rung.

13. A method as described in claim 12 wherein the extrusion is a rail and wherein the forming step includes the step of forming the rail into a desired shape.

\* \* \* \* \*